United States Patent [19]

Yerushalmy et al.

[11] 4,367,393
[45] Jan. 4, 1983

[54] GAS SHIELDED PLASMA ARC TORCH WITH IMPROVED COLLET

[75] Inventors: Yosef Yerushalmy; Larry W. Stokes, both of Florence, S.C.

[73] Assignee: Union Carbide Corporation, Danbury, Conn.

[21] Appl. No.: 219,874

[22] Filed: Dec. 24, 1980

[51] Int. Cl.³ .............................................. B23K 9/16
[52] U.S. Cl. ............................ 219/121 PM; 219/75; 219/121 PR; 219/121 PP; 219/74
[58] Field of Search .................. 219/121 PY, 121 PR, 219/121 PQ, 121 PM, 121 PP, 121 P, 121 R, 74, 75, 76.16; 313/146, 147, 231.3–231.5

[56] References Cited

U.S. PATENT DOCUMENTS

| | | |
|---|---|---|
| 2,797,301 | 6/1957 | Copleston .......................... 219/75 |
| 3,250,889 | 5/1966 | Himmelman ........................ 219/75 |
| 3,522,406 | 8/1970 | Sipos et al. ........................ 219/74 |
| 3,557,337 | 1/1971 | Sipos et al. ........................ 219/75 |
| 3,940,586 | 2/1976 | Stearns et al. ...................... 219/75 |
| 4,250,373 | 2/1981 | Tanida ............................... 219/75 |
| 4,268,740 | 5/1981 | Sanders ............................. 219/75 |

Primary Examiner—M. H. Paschall
Attorney, Agent, or Firm—E. Lieberstein

[57] ABSTRACT

A gas shielded plasma arc torch having a collet for receiving and gripping an electrode wherein the collet has a portion with a substantially spherical surface geometry for engagement with and rotation in first and second seating means within the torch and means for locking the position of the collet thereby locking and fixing the position of the electrode with respect to the torch.

3 Claims, 4 Drawing Figures

GAS SHIELDED PLASMA ARC TORCH WITH IMPROVED COLLET

This invention relates to a device for locking an arc torch electrode in a fixed position in a gas shielded plasma arc torch. More particularly, this invention relates to a device which will lock an arc torch electrode in a selected position in a gas shielded plasma arc torch without creating forces tending to move the arc torch electrode off the selected locked position. The invention is most particularly useful for gas shielded plasma arc torch electrode centering.

BACKGROUND OF THE INVENTION

In plasma arc cutting or welding of metals, a non consumable electrode is recessed within an arc torch nozzle having a constricting outlet orifice. A gas, sometimes referred to as the orifice gas, is passed through the torch bore surrounding the electrode and exits through the constricting orifice. An electric arc is established between the tip of the electrode and the metal workpiece through the constricting orifice. The orifice gas is ionized by the arc to form a plasma and thus issues from the constricting nozzle orifice as a plasma jet. The ionized gas also provides a low electrical resistance path between the electrode and the workpiece. Stated otherwise, a closed electric circuit is maintained by the plasma arc directly between the tip of the electrode and the metal workpiece.

As is well known in the art, it is essential that the tip of the electrode be centered accurately with respect to the constricting outlet orifice. This permits the exiting orifice gas to surround, in a uniform manner, the tip of the electrode and the established electric arc as the gas approaches and issues from the constricting outlet orifice.

If the tip of the electrode is not accurately centered with respect to the constricting outlet orifice, what is referred to in the art as double arcing will occur. This is the jumping of the main current arc from the electrode to the nozzle and then from the nozzle to the workpiece. Double arcing usually destroys the nozzle. Double arcing usually occurs at the start of cutting or welding but may occur during cutting or welding if a properly centered electrode slips from its centered position.

Even if double arcing does not occur, an off center electrode still disrupts the plasma discharged from the constricting outlet orifice and impairs the quality of the cut or weld.

Therefore, those skilled in the art have attempted many approaches to insure that the tip of the electrode is accurately centered with respect to the constricting outlet orifice of a plasma arc torch nozzle. One approach has been to design the various parts of the torch with very close tolerances so that an assembled torch holding an electrode will achieve the required degree of electrode centering. Manufacture of such torch parts to the tolerances required is difficult and expensive. Moreover, even if a torch were manufactured to the required tolerance, the electrode itself may have eccentricities which will cause the tip of the electrode to be off center with respect to the constricting outlet orifice. That is, even though the electrode may be said to be a rigid rod, a given electrode will most likely have eccentricities about a nominal straight center axis.

Because of poor electrode centering, operators have frequently had to resort to rotation of the electrode and the electrode holder and, in some cases, even to bending of the electrode. However, these time consuming procedures have not resulted in sufficiently accurate centering, in many instances, to eliminate double arcing and to produce the desired high quality cuts or welds.

A second approach to the problem is to provide the torch with an adjustable electrode holding device for centering the electrode by the manual adjusting of the holding device. A torch which employs this approach is described and claimed in U.S. Pat. No. 3,069,532 to Hill et al. In U.S. Pat. No. 3,069,532, a collet for gripping and locking an electrode in a selected position is pivoted in the seat of what is referred to as an electrode holder. The point of pivoting is described in U.S. Pat. No. 3,069,532 as being in the lower portion of the torch bore (i.e., near the torch nozzle). The seat has the shape of a cone and the surface of the collet which pivots in the seat has the shape of a cone. That is, the geometric description of the pivot point would be a cone within a cone. The collet is released or locked in its position in the electrode holder seat by frictional force provided by a knob screwed into the upper end of the electrode holder (i.e., at the end of the torch opposite the torch nozzle). When the collet is released by retracting the knob, the collet and hence the electrode may be pivoted about the collet seat located near the bottom of the torch body bore. Thus a skilled operator can adjust the position of the electrode with respect to the center of constricting outlet orifice. After the tip is centered, the operator would then tighten the knob to lock the collet and the gripped electrode in place. Unless long collets were used, it was found that the tightening operation had a tendency to cause the collet to slip from the adjusted position which, in turn, would cause the tip of the electrode to move away from its centered position. The shorter the collet, the greater was the tendency to slip. This is believed attributable to the inability of the collect assembly to adequately lock the electrode in all adjusted positions. Hence, torch design was constrained by the desirability to use long collets.

OBJECT OF THE INVENTION

It is therefore an object of the present invention to provide a gas shielded plasma arc torch having a construction in which the electrode is held in a stable configuration for all adjusted positions.

It is a further object of the present invention to provide a gas shielded plasma arc torch having a construction which will permit the gripping and locking an electrode with its tip centered with respect to the center of the torch nozzle constricting outlet orifice so that there is no tendency for the electrode to slip from its locked position.

It is still a further object of the present invention to provide a gas shielded plasma arc torch with an adjustable collet assembly having an improved collet.

It is yet another object of the present invention to provide a gas shielded plasma arc torch and an adjustable collet assembly construction which functions independent of the length of a collet and permits the electrode to be held in a stable configuration without a tendency to slip for all adjusted positions.

Moreover, it is still a further object of the present invention to provide a gas shielded plasma arc torch which will permit the gripping of an electrode in a stable configuration for all positions assumable by the electrode in the torch bore such that the tip of an electrode may be accurately centered with respect to the torch nozzle constricting outlet orifice by a relatively unskilled operator and without the need for the exercise of operator judgment.

These and other objects will be apparent from the following description and claims in conjunction with the drawings.

SUMMARY OF THE INVENTION

The present invention may be generally characterized as a gas shielded plasma arc torch and collet in combination comprising:

said torch having a bore for receiving an electrode;

said collet having a bore therethrough for receiving and gripping said electrode including a first portion and a second portion with said first portion having a substantially spherical surface geometry for providing first and second spherical seating surfaces located in opposed hemispheres of said spherical surface geometry;

first means for rotatably engaging said first spherical seating surface;

second means for rotatably engaging said second spherical seating surface; and means for locking the position of said collet with respect to said torch said locking means being reversibly operable for releasing said collet.

A second aspect of the present invention may be generally characterized as a collet assembly for use in a gas shielded plasma arc torch having a bore for receiving an electrode comprising:

a collet for receiving and gripping said electrode in said torch with said collet having a first portion comprising a plurality of jaw-like members and a second portion with said first portion having a substantially spherical surface geometry; and means for rotatably mounting said collet within said torch by said means engaging said spherical surface geometry of said collet first portion.

A third aspect of the present invention may be generally characterized as a collet having a bore extending therethrough from a first end to an opposite second end for receiving an electrode for use in a gas shielded plasma arc torch comprising:

a first portion having a substantially spherical surface geometry comprising a plurality of jaw-like members with said spherical surface geometry providing a first spherical seating surface located in a first hemisphere of said spherical surface geometry adjacent said collet first end and a second spherical seating surface located in a second opposed hemisphere of said spherical surface geometry wherein said second spherical seating surface is intermediate said collet first and second end; and a second portion comprising a cylindrical shaped elongated member contiguously associated with and extending from said first portion along said bore longitudinal axis toward said collet second end wherein the external surface of said elongated member parallel said axis is smooth.

DESCRIPTION OF THE PREFERRED EMBODIMENT

In order to afford a complete understanding of the present invention and an appreciation of its advantages, a description of the preferred embodiments is presented below.

Figure 1:
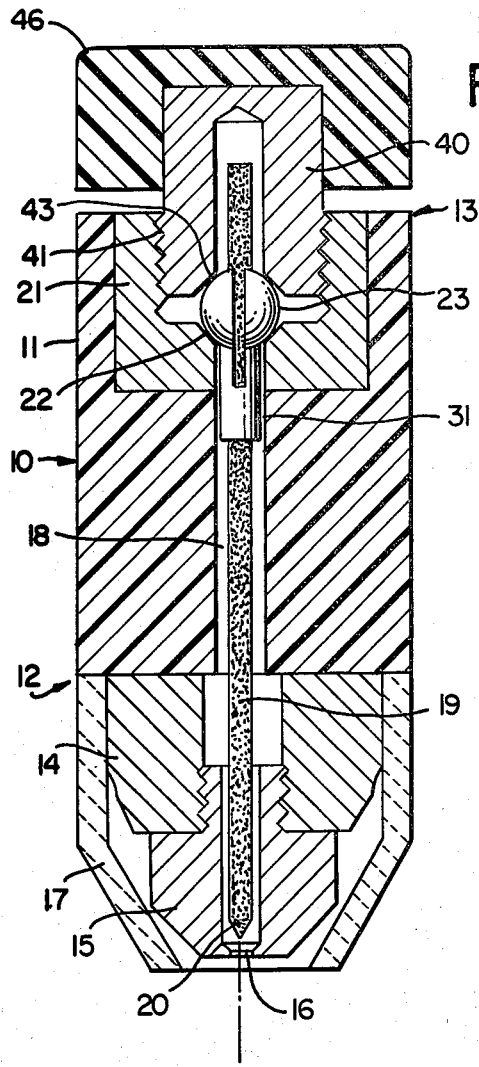
FIG. 1 is a simplified schematic drawing in cross-section of a gas shielded plasma arc torch in accordance with the present invention.

With reference to the drawings, FIG. 1 illustrates a gas shielded plasma arc torch 10 in accordance with the present invention. Torch 10 comprises a torch body 11, suitably molded of plastic, having a front end 12 and a rear end 13. A replacable front end member 14 is joined to the front end 12 of the torch body 11, for example, by screws (not shown). A gas nozzle 15 having a constricting outlet orifice 16 is joined to the front end member 14, for example, by a screw type fitting. A heat shield 17 is joined to front end member 14, for example, by threads (not shown) and surrounds the gas nozzle 15 and front end member 14. The torch has a bore 18 for receiving a rigid non consumable electrode 19, for example, constructed of tungsten or zirconium. The tip 20 of electrode 19 is illustrated centered with respect to the gas nozzle constricting outlet orifice 16. Such gas shielded plasma arc torches are well known in the art of cutting and welding and would have connections and passages for orifice gas, shielding gas, cooling water, main arc electrical power, and pilot arc high frequency electrical power (all not shown). The orifice gas exits the torch through gas nozzle 15 via constricting outlet orifice 16.

Positioned within the torch body 11 is collet support member 21 which is embedded in the torch body. Collet support member 21 is suitably fabricated from, e.g., copper or copper alloy. Collet support member 21 has a bore therethrough with the central axis of the collet support member bore substantially coinciding with the central axis of the torch body bore 18. The collet support member 21 and/or the collet support member seat 22 are advantageously located in the rear portion of the torch body 11. By rear portion of the torch body is meant that if torch body 11 is divided into two halves lengthwise (i.e., measured from the torch body rear end 13 to torch body front end 12) the rear portion of the torch body would be that portion including the rear end 13. A portion of the collet support member bore defines a seating means 22 shown having the shape of a truncated cone. That is, seat 22 has an inclined edge surface. The base of truncated cone defining the seat 22 faces the rear end of the torch body with the plane of the base being substantially perpendicular to the center line of the bore. Other geometric shapes for the seating means 22 may be used by one skilled in the art.

A collet 23 for receiving and gripping electrode 19 is located in collet support member 21.

Figure 2B:
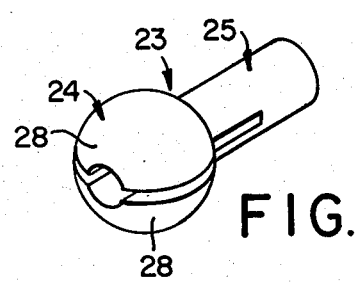
FIGS. 2B is a perspective view of the collet of FIG. 2A in accordance with the present invention.
Figure 2A:
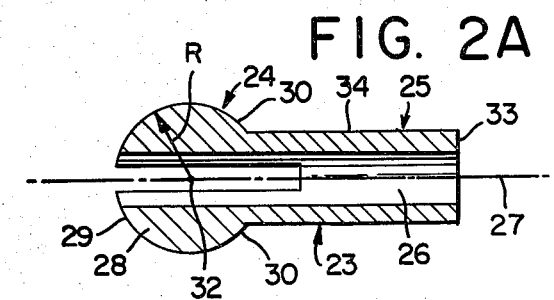
FIG. 2A is a drawing in cross-section of a collet used in the gas shielded plasma arc torch of FIG. 1 in accordance with the present invention.

Collet 23, illustrated in detail in FIGS. 2A and 2B, comprises a first portion 24 which has a substantially spherical surface geometry and a second portion 25 which is an elongated member contiguously associated with and extending from first portion 24. Collet 23 has a bore 26 extending therethrough with the central axis 27 of the bore being the longitudinal axis of collet 23. Collet 23 is suitably fabricated from, e.g., brass, copper or copper alloy.

The surface of collet first portion 24 is defined by a sphere having radius R suitably having its center 32 substantially located on central axis 27 of collet bore 26. Collet first portion 24 comprise a plurality of jaw-like members 28 terminating in a collet first end spherical surface 29. The combined outer surfaces of the plurality of jaw-like members 28 thus comprise the spherical surface geometry of collet first portion 24. As illustrated in FIGS. 2A and 2B, collet 23 first portion 24 comprises two jaw-like members 28. However, three, four or more jaw-like members may be used.

The torch also includes a knob member 40, suitably constructed of copper, copper alloy or brass, positioned at the rear end 13 of torch body 11. The knob member 40, as illustrated in FIG. 1, has a recessed construction, stated otherwise a bore, for receiving collet 23 and electrode 19. The recessed construction or bore of knob member 40 also forms a knob member seating means 43 illustrated as having inclined edge surfaces. That is, the illustrated knob member seating means 43 may also be said to have the shape of a truncated cone with the base of the cone facing the forward end 12 of the torch body 11. Other geometric shapes for seating means 43 may be used by one skilled in the art.

Knob member 40 is joined to collet support member 21 by screw type fitting 41. When knob member 40 is joined to collet support member 21, the central axis of the bore defining the inclined edges of seating means 43 would desirably be substantially coincident with the central axis of torch bore 18.

Collet first portion 24 having the spherical surface geometry is illustrated (FIG. 1) engaging knob member seating means 43 with collet first end spherical seating surface 29. That is, the spherical surface geometry of collet first portion 24 provides a spherical seating surface for rotatably engaging knob member seating means 43. Knob member seating means 43 restrains collet 23 from movement parallel to the longitudinal axis of torch bore 18 in a direction toward the rear end 13 of torch body 11.

The spherical geometry of the surface of collet first portion 24 also provides a second spherical seating surface 30 adjacent the contiguous contact of elongated second collet portion 25 with spherical first collet portion 24. That is, the second seating surface 30 provided by the spherical surface geometry of collet first portion 24 is that surface portion near the intersection of elongated second collet portion 25 with spherical first collet portion 24. Typically, second spherical seating surface 30 would be located in the hemisphere of spherical first collet portion 24 adjacent elongated second collet portion 25. Thus, first spherical seating surface 29 is located in the opposite or opposed hemisphere of the sphere defining the spherical surface geometry of collet first portion 24.

Collet first portion 24 second spherical seating surface 30 is illustrated (FIG. 1) engaging collet support member seating means 22. Accordingly, seating means 22 restrains collet 23 from movement parallel to the longitudinal axis of torch bore 18 in a direction toward the front end 12 of torch body 11.

Thus collet 23 first portion 24 has a substantially spherical surface geometry providing a first spherical seating surface located in one hemisphere of the sphere defining the first portion 24 spherical surface geometry and a second spherical seating surface located in the opposed or opposite hemisphere of the sphere defining the first portion 24 spherical surface geometry. The first and second spherical seating surfaces each rotatably engage seating means to mount collet 23 in torch 10.

The rear end portion of knob member 40 is suitably covered with handle member 46 suitable formed of, e.g., plastic.

A collect assembly may be referred to as comprising the collet 23 and the means for mounting the collet 23 within the torch 10, e.g., seating means 22 and seating means 43.

The collet 23, the collet support member 21, and the collet knob member 40 function as follows in gripping and fixing and locking the position of a received electrode 19.

Screw type fitting 41 joining knob member 40 to collet support member 21 permits knob member 40 to be tightenable. That is, upon tightening knob member 40 (e.g., providing an external clockwise force to knob member 40 if screw type fitting 41 is a right hand screw or an external counter-clockwise force if screw type fitting 41 is a left hand screw) seating means 43 of knob member 40 firmly engages first end spherical surface 29 of spherical first collet portion 24 thereby transmitting a force component parallel to the center line of torch body bore 18 in the forward direction through collet 23. Collet support member seat 22 in engagement with second spherical seating surface 30 of spherical collet first portion 24 therefore establishes an opposite reaction force component parallel to the center line of torch body bore 18. (It will be readily understood by one skilled in the art that torch body 11 is being restrained from motion by a second externally applied force when knob member 40 is being tightened.)

It will be apparent that the forces established by tightening knob 40 will create forces to lock and fix the position of collet 23 between knob member seating means 43 and collet support member seating means 22. That is, the position or location of collet 23 will become locked or fixed with respect to torch bore 18 by the forces established by tightening knob member 40.

Knob member 40 is likewise reversibly operable to unlock or release collet 23.

The collet 23 is caused to grip and fix and lock the position of a received electrode 19 in the following manner. Referring to FIGS. 2A and 2B, the first portion 24 of collet 23 comprises a plurality of jaw-like or prong-like members 28 which are an integral, continuous portion of collet 23. Without the application of an external force, the collet 23 loosely holds the received electrode 19 in collect bore 26. Jaws 28 have internal surfaces (i.e., facing collet bore-center line 27 and forming in essence a portion of collet bore 26) for gripping and thereby locking and fixing the position of a received electrode with respect to the collet when force components are established on jaw-like or prong-like members 28 urging them toward collet bore center line 29.

Accordingly, when knob member 40 is tightened urging collet 23 against collet support member seat 22, knob member seating means 43 will establish force components (i.e., substantially perpendicular to center line 27 of collet bore 26) at the area of contact of collet first end spherical surface 29 with knob member seating means 43 to urge jaw-like members 28 to grip and lock and fix the position of electrode 19 with respect to collet 23. Thus, the geometry of seating means 43 is selected to perform this function. Since the tightening of knob member 40 locks and fixes the position of collet 23 with respect to torch 10, the position of electrode 19 is likewise locked and fixed with respect to torch 10.

In the embodiment of the present invention illustrated in FIGS. 1, 2A, and 2B, tightening of knob member 40 will also establish force components substantially perpendicular to center line 27 of collet bore 26 at the area of contact of second spherical seating surface 30 of spherical first collet portion 24 to assist urging jaw-like members 28 to grip and lock and fix the position of electrode 19 with respect to collet 23. Thus, the geometry of collet support member seating means 22 is also selected to perform this function.

Reversibly operating knob member 40 causes collet 23 to release received electrode 19.

The operation of the present invention is as follow. Knob member 40 is slightly loosened and accordingly, collet 23 is unlocked. Collet 23 may then rotate on second spherical seating surface 30 engaging collet support member seating means 22 and on first end spherical surface 29 engaging knob member seating means 43.

It will be noted that elongated collet second portion 25 extends through the aperture 31 formed by the bore defining collet support member seating means 22. The external surface of elongate collet second portion 25 would preferably have a cylindrical shape. The clearance between elongated collet second portion 25 and the walls of collet support member aperture 31 would be selected to permit collet 23 to rotate sufficiently with respect to torch bore 18 to allow an electrode 19 received by collet 23 to assume any position permitted by torch bore 18.

Accordingly, collet 23 is rotatably mounted in torch 10 by the engagement of the spherical surface geometry of collet first portion 24 with collet support member 21 seating means 22 and knob member 40 seating means 43. Collet 23, collet support member 21, and knob member 40 are arranged and constructed so that collet 23 may rotate with respect to torch bore 18 to permit an electrode 19 received by collet 23 to assume any desired adjustable position within torch bore 18.

It is contemplated that rotation of collet 23 will be induced as follows. Heat shield 17 and gas nozzle 15 are removed from torch 10. The tip 20 and the forward end of electrode 19 are now exposed. Knob member 40 is loosened slightly. The tip 20 of electrode 19 is now moved by an external source to a selected position. It will be apparent that it would be highly advantageous if this selected position was the position which would accurately center tip 20 of electrode 19 with respect to constricting outlet orifice 16 of gas nozzle 15. Since electrode 19 is received by collet 23, movement of tip 20 of electrode 19 to a selected position will cause the hereinbefore described rotation of collet 23. That is, collet first portion 24 having the spherical surface geometry engaging knob member seating means 43 and collet support member seating means 22 rotates about center point 32 of the sphere (defined by radius R) defining the spherical surface geometry of collet first portion 24.

Knob member 40 is then tightened causing the locking of collet 23 with respect to torch 10, the gripping of electrode 19 by collet 23 jaw-like members 28, and thereby the locking and fixing of the electrode 19 and accordingly fixes the position selected for the tip 20 of electrode 19 with respect to the torch.

It will be apparent to one skilled in the art that because of the design of collet 23, collet support member seating means 22 and knob member seating means 43, no forces are established in locking and fixing the position of electrode 19 which would tend to cause the collet to slip and hence move electrode 19 from its selected fixed locked position. Hence, electrode 19 has been gripped and locked and fixed in position in a stable configuration.

As hereinbefore described, collet 23 second portion 25 comprises an elongated member 25 contiguously associated with and extending from spherical first collet portion 24 along collet bore 26 longitudinal axis 27 away from collet first end spherical surface 29 toward the opposite second end 33 of the collet. Elongated collet second portion 25 does not contact the torch and hence does not interfere with the rotation of collet 23 resulting from the spherical surface geometry of collet first portion 24 engaging seating means 22 during the normal functional operation of selecting and fixing and locking the position of electrode tip 20 with respect to the torch. Thus, the external surface 34 of the elongated member 25 (which preferably has a cylindrical geometry) is desirably smooth. That is, connection means such as threads are not need on the surface of elongated member 25 since elongated member 25 is not used to connect or mount collet 23 to the torch.

Elongated member 25 permits fabrication of a collet which can be rotably mounted on seating means in a gas shielded plasma arc torch wherein the collet surface geometry engaging two seating means is defined by a single sphere.

A significant advantage of the adjustable collet assembly and collet in accordance with the present invention is that they function independent of the length of the collet to lock an electrode in a stable configuration without a tendency to slip in a gas shielded plasma arc torch for all adjustable positions of the electrode within the torch bore. This is advantageous in that torch design is not constrained by collet length requirements.

FIG. 1 illustrates collet 23 positioned within the torch with first portion 24 to the rear of second portion 25. Embodiments of the present invention are contemplated having the collet orientation reversed with respect to the torch.

It is contemplated that the tip of an electrode would be centered with respect to the constricting outlet orifice of a gas nozzle for the gas shielded plasma arc torch of the present invention in the following manner. The heat shield 17 and gas nozzle 15 of torch 10 illustrated in FIG. 1 are removed from torch 10. The tip 20 and the forward end of electrode 19 are now exposed. As hereinbefore described, knob member 40 is loosened slightly.

Figure 3:
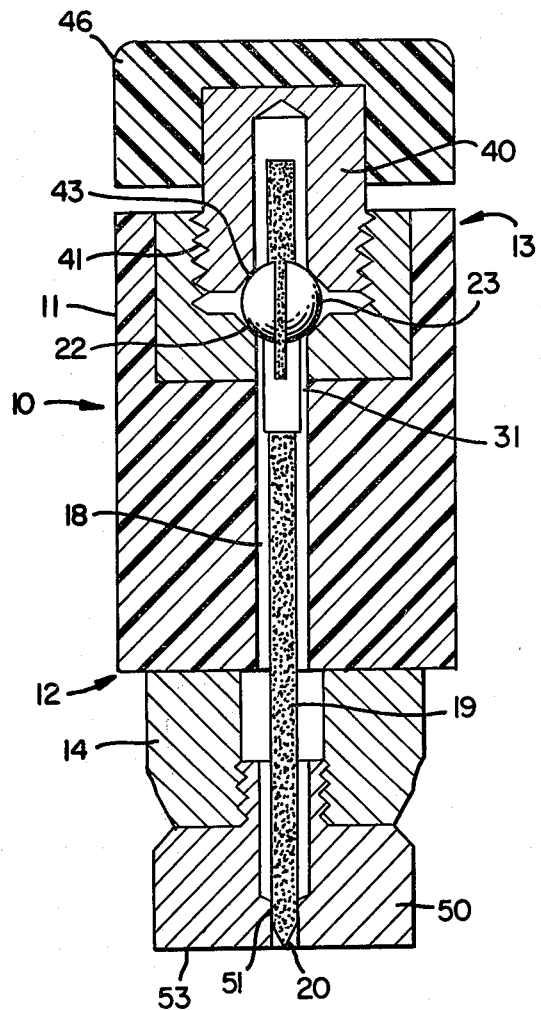
FIG. 3 is a simplified schematic drawing in cross-section of the gas shielded plasma arc torch of FIG. 1 with the heat shield and gas nozzle removed and an electrode centering tool installed in accordance with the present invention.

Referring to FIG. 3, an electrode centering tool 50 having a bore 51 for receiving the electrode 19 is engaged with the electrode and is screwed 52 and seated onto front end member 14 of torch 10 where nozzle 15 is normally screwed and seated. The bore 51 of tool 50 is accurately machined with respect to constricting outlet orifice 16 of nozzle 15 so as to accurately center the tip 20 of electrode 19 with respect to constricting nozzle orifice 16. The tip 20 of electrode 19 is now accurately centered, knob member 40 is tightened and accordingly electrode 19 and therefore tip 20 is fixed and locked in placed as hereinbefore described.

The electrode centering tool 50 may also be used to set the gap between the electrode tip 20 and the constricting nozzle orifice 16 by machining the tool 50 so that the correct gap is set when the electrode tip is flush with end 53 of tool 50 when the tool is seated. The electrode 19 would be manipulated prior to tightening knob member 40 to achieve this setting.

With electrode 19 fixed and locked with tip 20 being centered by tool 50, centering tool 50 is removed and the gas nozzle 15 and heat shield 17 are mounted in place.

The advantages of the gas shielded plasma arc torch in accordance with the present invention will be readily apparent. An electrode is gripped, fixed and locked in place with the tip of the electrode centered with respect to a constricting outlet orifice of a gas nozzle in a stable configuration without forces being established which will tend to move the electrode and hence the tip of the electrode off the centered position. The present invention functions independent of the length of the collet for all adjustable positions and thus, torch design is not constrained by collet length requirements.

Precision and expensive machining for the construction of the torch in order to achieve electrode centering by a precision torch construction is avoided. The elements of the torch bore of the present invention are not required to be aligned with precision. In the torch of the present invention, the tip of the electrode is positioned in the centered position (or any selected position) and the electrode is then locked and fixed in this position.

A rigid electrode having eccentricities is easily centered. The tip of the electrode is centered and then the electrode is locked and fixed in position.

The torch of the present invention permits accurate electrode centering with respect to a constricting outlet orifice without the need for operator skill or judgement.

Although preferred embodiments of the present invention have been described in detail, it is contemplated that modifications may be made and that some features may be employed without others, all within the spirit and scope of the invention.

What is claimed is:

1. An arc torch comprising; a body with a longitudinal bore for receiving a nonconsumable electrode, a gas nozzle connected to one end of said body, a collet disposed within said torch for holding said electrode in said bore with the tip of the electrode recessed within said nozzle and collet support means for supporting said collet at the end of said body opposite said nozzle, said collet support means including a first and a second member each having complimentary inclined surfaces spaced apart in an opposing arrangement which adjustably grip said collet with said collet comprising a first portion comprising a single spherical configuration seated between said first and second members contiguous to and in contact with each of said inclined surfaces and an elongated stem integral with said first portion and surrounding said electrode whereby the spherical first portion of said collet functions as a universal ball joint for adjusting the position of the tip of the electrode relative to the central axis of the gas nozzle.

2. An arc torch as defined in claim 1 wherein said first member of said support means is a manually adjustable knob for adjusting the position of said first member relative to said second member such that upon adjustment said collet may be tightened or loosened.

3. An arc torch as defined in claim 2 wherein said inclined surfaces are relatively flat surfaces representing sections of truncated cones.

* * * * *